United States Patent
Van Dam et al.

(10) Patent No.: US 9,145,865 B2
(45) Date of Patent: Sep. 29, 2015

(54) ELECTRIC FLUID PUMP

(75) Inventors: Jeremy Daniel Van Dam, West Coxsackie, NY (US); Norman Arnold Turnquist, Carlisle, NY (US); Tsarafidy Raminosoa, Niskayuna, NY (US); Manoj Ramprasad Shah, Latham, NY (US); Xiaochun Shen, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 546 days.

(21) Appl. No.: 13/538,197

(22) Filed: Jun. 29, 2012

(65) Prior Publication Data

US 2014/0001893 A1    Jan. 2, 2014

(51) Int. Cl.
*H02K 5/12*  (2006.01)
*F03B 3/10*  (2006.01)
(Continued)

(52) U.S. Cl.
CPC ........... *F03B 3/103* (2013.01); *F03B 13/02* (2013.01); *F04D 13/0646* (2013.01); *F24J 3/085* (2013.01); *H02K 1/20* (2013.01); *H02K 5/12* (2013.01); *H02K 5/1285* (2013.01); *H02K 5/132* (2013.01); *H02K 5/20* (2013.01); *H02K 7/088* (2013.01); *H02K 7/14* (2013.01); *H02K 7/1823* (2013.01); *H02K 9/19* (2013.01); *H02K 16/00* (2013.01); *H02K 21/22* (2013.01);
(Continued)

(58) Field of Classification Search
CPC ............. H02K 1/20; H02K 1/32; H02K 5/12; H02K 5/128; H02K 5/1285; H02K 5/20; H02K 5/132; H02K 7/14; H02K 7/18

USPC .................... 310/52, 58, 61, 62, 87
See application file for complete search history.

(56) References Cited

U.S. PATENT DOCUMENTS

| 4,831,297 A | 5/1989 | Taylor et al. |
|---|---|---|
| 5,273,404 A | 12/1993 | Wu |

(Continued)

FOREIGN PATENT DOCUMENTS

| DE | 102009023188 A1 | 12/2010 |
|---|---|---|
| EP | 0067704 A2 | 12/1982 |

(Continued)

OTHER PUBLICATIONS

Brennan, "Understanding and Using Sealless Rotary Pumps", Imo Pump, Cincinnati, Oct. 29, 1998, 6 Pages.

(Continued)

*Primary Examiner* — Michael Andrews
(74) *Attorney, Agent, or Firm* — Andrew J. Caruso

(57) ABSTRACT

An electric machine is presented. The electric machine includes a hollow rotor; and a stator disposed within the hollow rotor, the stator defining a flow channel. The hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the hollow rotor is characterized by a largest cross-sectional area of hollow rotor, and wherein the flow channel is characterized by a smallest cross-sectional area of the flow channel, wherein the smallest cross-sectional area of the flow channel is at least about 25% of the largest cross-sectional area of the hollow rotor. An electric fluid pump and a power generation system are also presented.

4 Claims, 8 Drawing Sheets

(51) Int. Cl.
- *H02K 7/14* (2006.01)
- *H02K 9/19* (2006.01)
- *F04D 13/06* (2006.01)
- *F03B 13/02* (2006.01)
- *F24J 3/08* (2006.01)
- *H02K 1/20* (2006.01)
- *H02K 5/128* (2006.01)
- *H02K 5/132* (2006.01)
- *H02K 5/20* (2006.01)
- *H02K 7/08* (2006.01)
- *H02K 7/18* (2006.01)
- *H02K 16/00* (2006.01)
- *H02K 21/22* (2006.01)

(52) U.S. Cl.
CPC ............ *H02K 2213/12* (2013.01); *Y02E 10/14* (2013.01); *Y02E 10/223* (2013.01)

(56) References Cited

U.S. PATENT DOCUMENTS

| | | | |
|---|---|---|---|
| 5,932,940 A * | 8/1999 | Epstein et al. | 310/40 MM |
| 5,939,813 A * | 8/1999 | Schob | 310/87 |
| 6,099,271 A | 8/2000 | Brookbank | |
| 6,120,261 A | 9/2000 | Al-Towailib | |
| 6,140,725 A | 10/2000 | Jensen et al. | |
| 7,291,936 B1 | 11/2007 | Robson | |
| 7,299,873 B2 | 11/2007 | Hartman et al. | |
| 7,679,242 B2 | 3/2010 | Parmeter et al. | |
| 7,686,075 B2 | 3/2010 | Stewart et al. | |
| 7,971,650 B2 | 7/2011 | Yuratich et al. | |
| 2003/0124005 A1 | 7/2003 | Bostwick et al. | |
| 2003/0156947 A1 | 8/2003 | Gross | |
| 2009/0142207 A1 | 6/2009 | Ring et al. | |
| 2010/0003871 A1 * | 1/2010 | Wishart | 310/115 |
| 2010/0102648 A1 | 4/2010 | Tetzlaff et al. | |
| 2010/0129239 A1 | 5/2010 | Hadar et al. | |
| 2011/0198848 A1 * | 8/2011 | Rytlewski et al. | 290/52 |

FOREIGN PATENT DOCUMENTS

| | | |
|---|---|---|
| JP | 2002168189 A | 6/2002 |
| JP | 2004150390 A | 5/2004 |
| WO | 0159288 A2 | 8/2001 |

OTHER PUBLICATIONS

International Search Report and Written Opinion issued in connection with corresponding Application No. PCT/US2013/036304 on Nov. 11, 2014.

* cited by examiner

ELECTRIC FLUID PUMP

BACKGROUND

One or more aspects of the invention described herein were developed under Cooperative Agreement DE-EE0002752 for the U.S. Department of Energy entitled "High-Temperature-High-Volume Lifting for Enhanced Geothermal Systems." As such, the government has certain rights in this invention.

BRIEF DESCRIPTION OF THE INVENTION

In one aspect, the present invention provides an electric machine configuration. In a particular aspect, the present invention provides an electric motor configuration, which is particularly useful for well fluids lifting systems.

Well fluid lifting systems, such as, for example, electrical submersible pump (ESP) systems are used in a wide variety of environments, including wellbore applications for pumping production fluids, such as water or petroleum. The submersible pump system includes, among other components, an induction motor used to power a pump, lifting the production fluids to the surface. A conventional motor employed in a well fluid lifting system includes a stator and a rotor located inside the stator, such that the fluid to be pumped flows outside the rotor and the stator. However, a major challenge with the conventional well fluid lifting systems is to provide electric machine configurations that can withstand the extreme pressure and temperature of thermal energy recovery wells while providing the maximum power for pumping the fluid.

Thus, there is a need for improved electric machine configurations, such as, for example, electric motor configurations with high power ratings that provide for improved rate of production and are capable of withstanding the extreme temperature and pressure conditions.

BRIEF DESCRIPTION OF THE INVENTION

In accordance with one aspect of the present invention, an electric machine is presented. The electric machine includes a hollow rotor; and a stator disposed within the hollow rotor, the stator defining a flow channel. The hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the hollow rotor is characterized by a largest cross-sectional area of the hollow rotor, and wherein the flow channel is characterized by a smallest cross-sectional area of the flow channel, wherein the smallest cross-sectional area of the flow channel is at least about 25% of the largest cross-sectional area of the hollow rotor.

In accordance with another aspect of the present invention, an electric fluid pump is presented. The electric fluid pump includes an electric motor including a hollow rotor; and a stator disposed within the hollow rotor, the stator defining a flow channel. The hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the hollow rotor is characterized by a largest cross-sectional area of the hollow rotor, and wherein the flow channel is characterized by a smallest cross-sectional area of the flow channel, wherein the smallest cross-sectional area of the flow channel is at least about 25% of the largest cross-sectional area of the hollow rotor. The electric fluid pump further includes a transition coupling configured to join the hollow rotor to a drive shaft of a pumping device to be powered by the electric motor; and one or more intake ports defined by the transition coupling, the first end portion, or both the transition coupling and the first end portion, said intake ports being in fluid communication with the fluid inlet and the flow channel of the stator. The electric fluid pump furthermore includes a pumping device including one or more impellers fixed to a drive shaft powered by the electric motor.

In accordance with yet another aspect of the present invention, an electric power generation device is presented. The electric power generation device includes a generator including a magnetic hollow rotor; and a stator disposed within the hollow rotor, the stator defining a flow channel. The magnetic hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the magnetic hollow rotor is characterized by a largest cross-sectional area of the hollow rotor, and wherein the flow channel is characterized by a smallest cross-sectional area of the flow channel, wherein the smallest cross-sectional area of the flow channel is at least about 25% of the largest cross-sectional area of the magnetic hollow rotor. The electric power generation device further includes a transition coupling configured to join the magnetic hollow rotor to a drive shaft of a turbine device configured to drive the hollow magnetic rotor; and one or more outlet ports defined by the transition coupling, the second end portion, or both the transition coupling and the second end portion; said outlet ports being in fluid communication with the flow channel of the stator. In some embodiments, the electric power generation device further includes a turbine device including one or more impellers fixed to the drive shaft. In some further embodiments, the turbine device includes a turbine device housing defining one or more fluid inlets.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, some of the embodiments of the invention relate to electric machine configurations. In some further embodiments, the present invention provides electric motor configurations and pumping systems including the electric motor configurations, which are particularly useful for well fluids lifting systems, such as, for example ESP systems.

The electric machine configurations in accordance with some embodiments of the invention advantageously provide for increased power density (power per unit length) of a machine compared to conventional machines. Further, in embodiments wherein the electric motor functions as a component of an electric submersible pump (ESP), the rate of production from a single well may be increased using the motor configurations described herein. Furthermore, the motor configurations in accordance with some embodiments of the invention may advantageously provide for improved thermal management.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
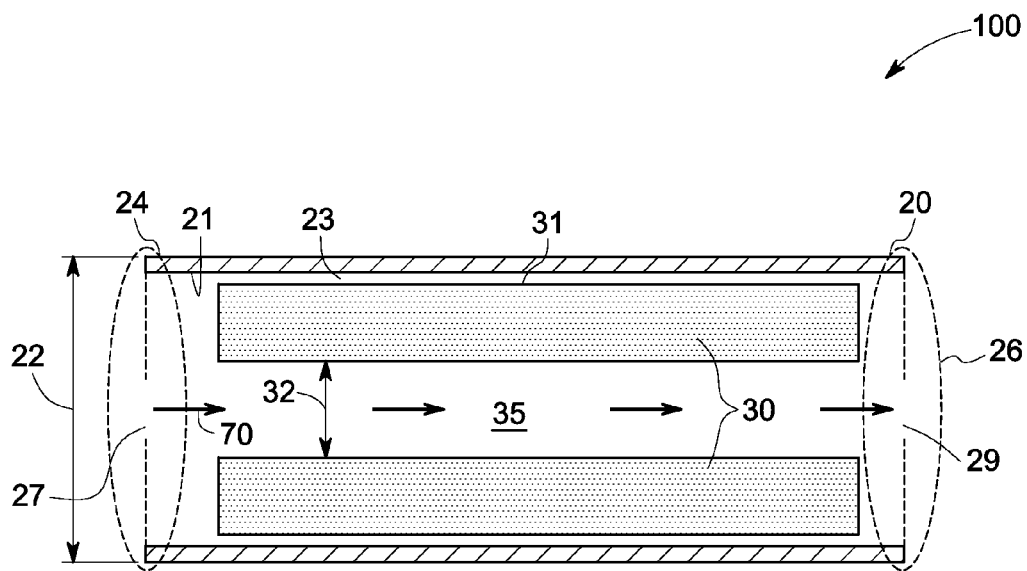
FIG. 1 illustrates a schematic of an electric machine in accordance with one or more embodiments of the present invention.

In some embodiments, an electric machine is presented. The term "electric machine" as used herein refers to electric motors and generators. Referring to FIG. 1, in some embodiments, the electric machine 100 includes a hollow rotor 20 and a stator 30 disposed within the hollow rotor 20. The stator 30 defines a flow channel 35 as indicated in FIG. 1. As further indicated in FIG. 1, the hollow rotor 20 includes a first end portion 24 defining a fluid inlet 27 and a second end portion 26 defining a fluid outlet 29. In some embodiments, the fluid inlet 27, the fluid outlet 29, and the flow channel 35 of the stator 30 are configured to allow passage of a fluid (indicated by direction arrows 70) from the fluid inlet 27 to the fluid outlet 29 via the flow channel 35, as illustrated in FIG. 1. As will be appreciated by one of ordinary skill in the art, the electric machine configuration 100 of FIG. 1 may represent an electric motor configuration or a generator configuration.

In some embodiments, as described in detail later, an electric motor is presented, the electric motor includes the configuration as described herein above. The motor configurations as described herein may also be referred to as "outside rotor motor" as the rotor is disposed outside the stator as compared to conventional motor configurations having a rotor disposed inside the stator. The fluid that passes through the flow channel 35 may also be referred to as a "working fluid", and the terms "fluid" and "working fluid" are used herein interchangeably.

In some embodiments, the hollow rotor 20 is characterized by a largest cross-sectional area of hollow rotor 20, as indicated by 22 in FIG. 1. The term "largest cross-sectional area as used herein refers to the cross-section area occupied by the hollow rotor, that is, the cross-section area defined by the outside dimension of the hollow rotor. In some embodiments, the flow channel 35 is characterized by a smallest cross-sectional area of the flow channel, as indicated by 32 in FIG. 1. In some embodiments, the smallest cross-sectional area 32 of the flow channel 35 is at least about 25% of the largest cross-sectional area 22 of the hollow rotor 20. In some embodiments, the smallest cross-sectional area 32 of the flow channel 35 is from about 25% to about 75% of the largest cross-sectional area 22 of the hollow rotor 20. In some embodiments, the smallest cross-sectional area 32 of the flow channel 35 is from about 30% to about 55% of the largest cross-sectional area 22 of the hollow rotor 20.

Without being bound by any theory, it is believed that the electric machine configurations in accordance with some embodiments of the invention advantageously provides for increased power density of a machine (such as, for example, an electric motor) compared to conventional machines. The increased power density may result from the arrangement of the rotor outside the stator, and the purposeful placement of the magnetic elements of the electric machine at the largest diameter possible within the allowed space. Further, in embodiments wherein the electric motor functions as a component of an electric submersible pump (ESP), the rate of production from a single well may be increased using the motor configurations described herein.

In some embodiments, as indicated in FIG. 1, the stator 30 is disposed coaxially within the hollow rotor 20. The term "coaxial" as used herein means that a geometrical axis of the stator 30 coincides with a rotational axis of the hollow rotor 20. In some other embodiments, the geometrical axis of the stator 30 may be longitudinally or laterally displaced with respect to the rotational axis of the hollow rotor 20. In particular embodiments, the stator 30 is disposed coaxially within the hollow rotor 20.

Figure 2:
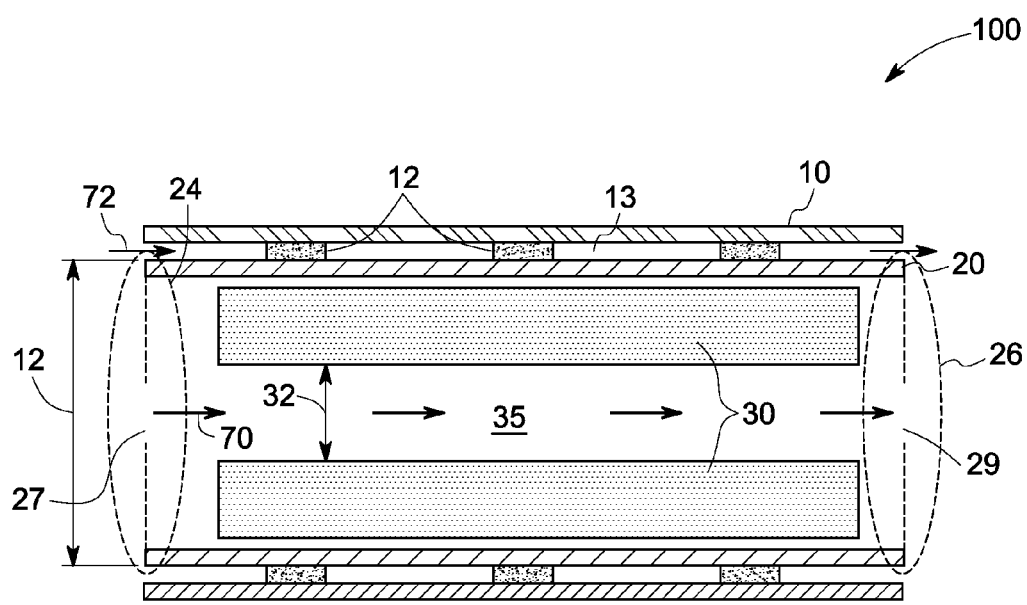
FIG. 2 illustrates a schematic of an electric machine in accordance with one or more embodiments of the present invention.

In some embodiments, the electric machine 100 is further disposed within a housing such that the hollow rotor is configured to rotate within the housing. Referring now to FIG. 2, the figure illustrates an electric machine 100 in accordance with some embodiments of the invention. The electric machine 100 includes a housing 10 and a hollow rotor 20 disposed within the housing 10. In some embodiments, the hollow rotor 20 may be supported within the housing 10 using a plurality of bearings 12, such as, for example, radial bearings. As indicated in FIG. 2, the electric machine 100 further includes a stator 30 disposed within the hollow rotor 20. The stator 30 defines a flow channel 35 as indicated in FIG. 2.

As further indicated in FIG. 2, the hollow rotor 20 includes a first end portion 24 defining a fluid inlet 27 and a second end portion 26 defining a fluid outlet 29. In some embodiments, the fluid inlet 27, the fluid outlet 29, and the flow channel 35 of the stator 30 are configured to allow passage of a fluid (indicated by direction arrows 70) from the fluid inlet 27 to the fluid outlet 29 via the flow channel 35, as illustrated in FIG. 2. In some embodiments, a gap 13 between the housing 10 and an outer surface of the hollow rotor 20 is configured to allow passage of a portion of the fluid, as indicated by direction arrows 72 in FIG. 2

In some embodiments, the electric machine further includes a transition coupling configured to join the hollow rotor to a drive shaft of a device, such as, for example, a pump or a turbine device. In some embodiments, wherein the electric machine is an electric motor, the transition coupling is configured to join the hollow rotor to a drive shaft of a device to be powered by the motor. In some embodiments, the electric machine further includes one or more intake ports defined by the transition coupling, the first end portion, or both the transition coupling and the first end portion; said intake ports being in fluid communication with the fluid inlet and the flow channel of the stator.

Figure 3:
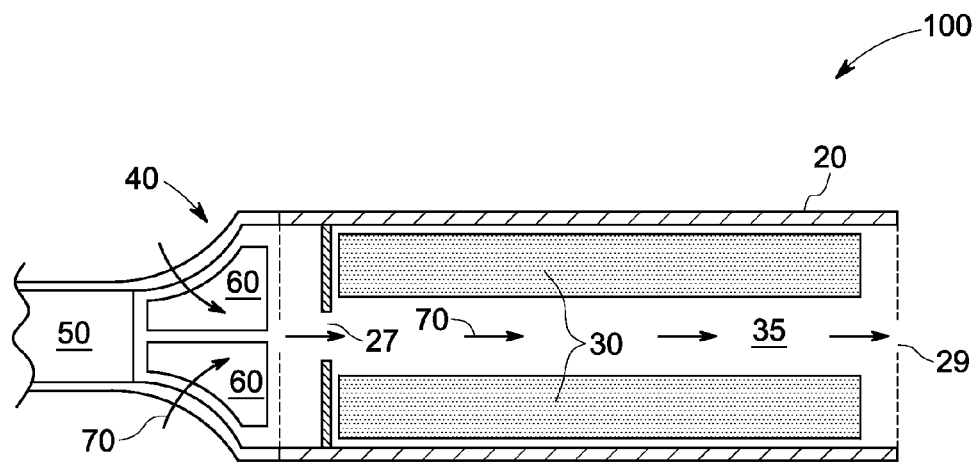
FIG. 3 illustrates a schematic of an electric motor in accordance with one or more embodiments of the present invention.

Referring now to FIG. 3, the figure illustrates an electric motor 100 in accordance with one embodiment of the present invention, the motor 100 includes a transition coupling 40 configured to join the hollow rotor 20 to a drive shaft 50 of a device (not shown) to be powered by the motor 100. In the embodiment shown, intake ports 60 allow a fluid to pass into the flow channel 35 via the fluid inlet 27 as suggested by flow direction arrows 70. In some embodiments, the intake ports 60 are characterized by one or more cross sectional areas, and a sum of these cross sectional areas of the intake ports is substantially equal to, or larger than, the smallest cross-sectional area of the flow channel 35.

Figure 4:
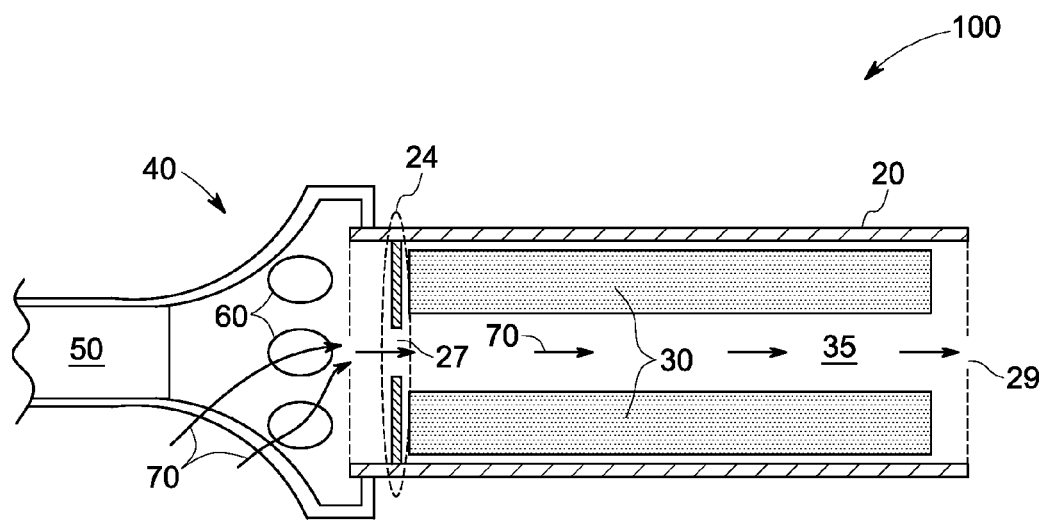
FIG. 4 illustrates a schematic of an electric motor in accordance with one or more embodiments of the present invention.

In some embodiments, the transition coupling 40 is integral to the drive shaft 50 of the device to be powered by the motor 100 and couples to the hollow rotor 20. Referring now to FIG. 4, the figure illustrates an electric motor 100 in accordance with one embodiment of the present invention. In the embodiment shown, the motor 100 is coupled to drive shaft 50 of a pump (not shown) configured to pump a fluid into and through the flow channel 35. In the embodiment shown, transition coupling 40 is shown as integral to the drive shaft 50. In this embodiment, the transition coupling defines intake ports 60, and the first end portion 24 of the hollow rotor 20 lacks intake ports. It should be noted that transition coupling 40, in this or any other embodiment, is not considered when determining the smallest cross-sectional area of the flow channel.

Figure 5:
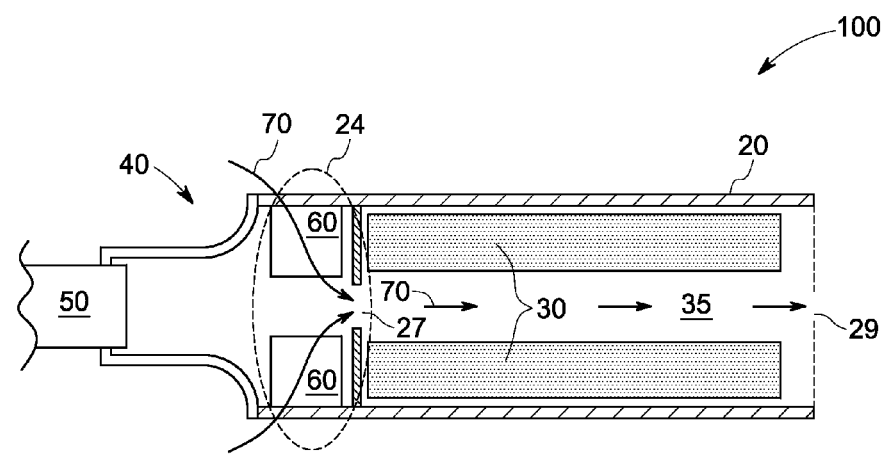
FIG. 5 illustrates a schematic of an electric motor in accordance with one or more embodiments of the present invention.

In some other embodiments, the transition coupling 40 is integral to the hollow rotor 20 and couples to drive shaft 50. Referring now to FIG. 5, the figure illustrates an electric motor 100 in accordance with one embodiment of the present invention. In the embodiment shown, transition coupling 40 is shown as integral to the hollow rotor 20. In the embodiment shown, the motor 100 is configured to power drive shaft 50 of a pump section (not shown) which acts upon and moves a working fluid axially along drive shaft 50, as indicated by direction arrows 70. The working fluid enters flow channel 35 via intake ports 60. In the embodiment shown, the first end portion 24 of the hollow rotor 20 defines one or more intake ports 60 and the transition coupling 40 lacks intake ports.

Figure 6:
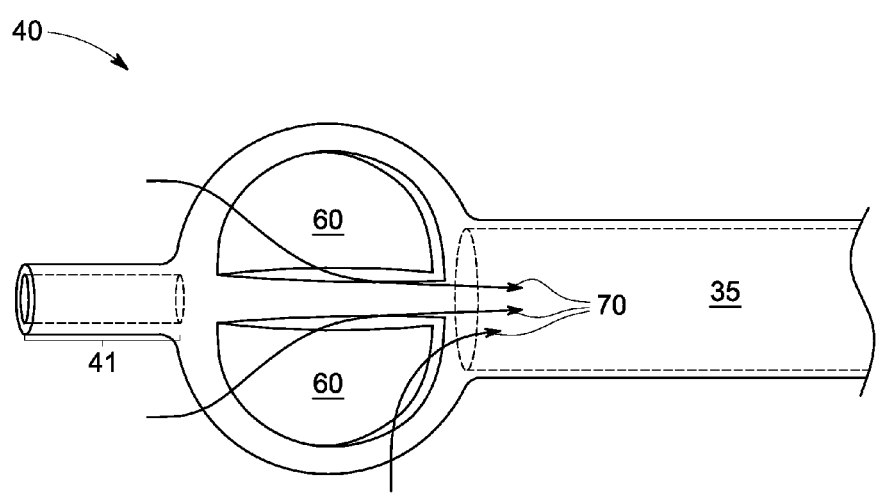
FIG. 6 illustrates a schematic of a transition coupling in accordance with one or more embodiments of the present invention.

Referring now to FIG. 6, the figure illustrates a transition coupling 40 which is integral to and forms part of a hollow rotor 20 according to some embodiments of the present invention. As indicated in FIG. 5, in some embodiments, the transition coupling 40 includes a first coupling 41 for joining the hollow rotor 20 with the drive shaft 50 of a pump (not shown) configured to pump a fluid into and through the flow channel 35.

Figure 7:
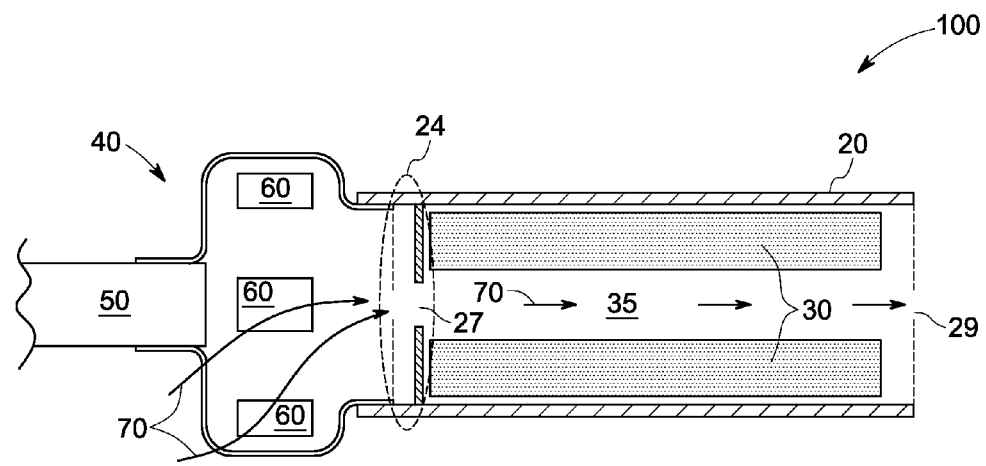
FIG. 7 illustrates a schematic of an electric motor in accordance with one or more embodiments of the present invention

In some embodiments, the transition coupling 40 is separate from the hollow rotor 20 and the drive shaft 50, and couples to each, for example, by friction joints, shrink fittings, threading, bolting, splines, or a combination thereof. Referring now to FIG. 7, the figure illustrates an electric motor 100 in accordance with one embodiment of the present invention. In the embodiment shown, transition coupling 40 is shown as separate from the hollow rotor 20 and the drive shaft 50. In the embodiment shown, the transition coupling 40 defines one or more intake ports 60 and the first end portion 24 lacks intake ports.

Figure 8:
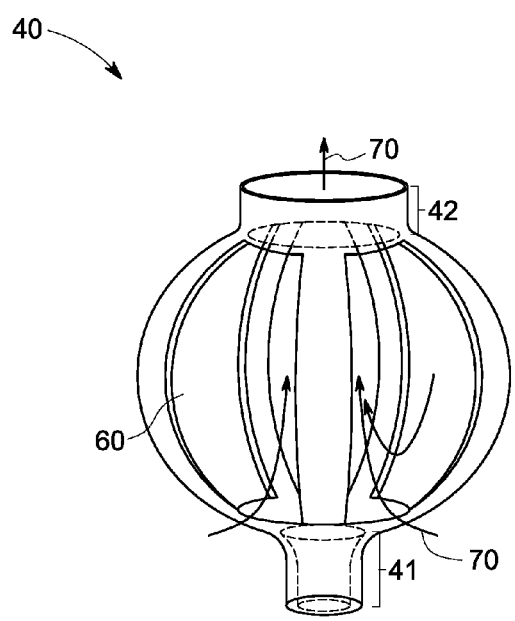
FIG. 8 illustrates a schematic of a transition coupling in accordance with one or more embodiments of the present invention.

Referring now to FIG. 8, the figure illustrates a transition coupling 40 according to some embodiments of the invention. In the embodiment shown, the transition coupling 40 is a single independent component configured to be joined via a first coupling 41 to a drive shaft 50 and configured to be joined via a second coupling 42 to a hollow rotor 20. As indicated, in some embodiments, the transition coupling 40 defines one or more intake ports 60.

In some embodiments, the electric machine 100 further includes a gap separating an outer surface of the stator and an inner surface of the hollow rotor. Referring now to FIG. 1, the figure illustrates an electric machine 100 in accordance with some embodiments of the invention. As indicated in FIG. 1, the electric machine 100 includes a gap 23 (sometimes referred to as air gap) separating an outer surface 31 of the stator 30 and an inner surface 21 of the hollow rotor 20.

Figure 9:
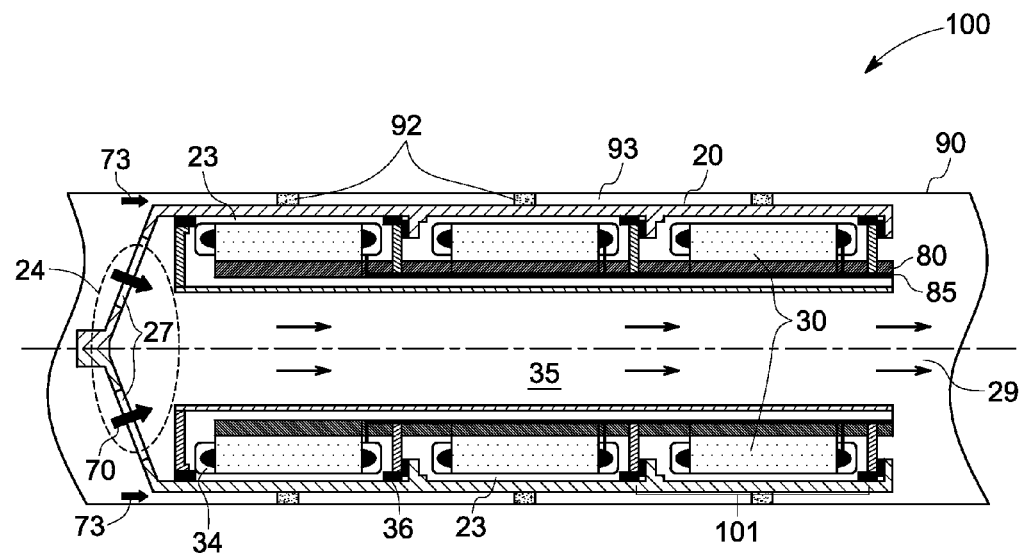
FIG. 9 illustrates a schematic of an electric machine in accordance with one or more embodiments of the present invention.

Referring now to FIG. 9, the figure illustrates an electric machine 100 configuration such that a gap 23 between the stator 30 and the hollow rotor 20 is in fluid communication with one or both of the fluid inlet 27 and the flow channel 35. In such embodiments, during operation, the gap 23 may further include a portion of the working fluid such that the working fluid provides for cooling of one or more machine components. In some embodiments, as described in detail later, the working fluid includes water and during operation of the machine 100, the gap 23 may include a portion of the pumped water that functions as a coolant fluid.

In some embodiments, the working fluid is transported directly into the flow channel of the stator and in close proximity to the primary heats sources, such as, for examples, winding coils and stator backiron. Without being bound by any theory, it is believed that the machine configurations in accordance with some embodiments of the invention advantageously provides for improved thermal management.

In some embodiments, as indicated in FIG. 9, the electric machine 100 further includes one or more electrical protection devices 34, such as, for example, canning devices or cans. In some embodiments, the one or more cans 34 are configured to provide a fluid bather so that wellbore fluids may be precluded from contacting one or more electrical components of the stator 30. In some embodiments, the electric machine further includes one or more fluid bearings, such as, for example, water bearings 36.

Figure 10:
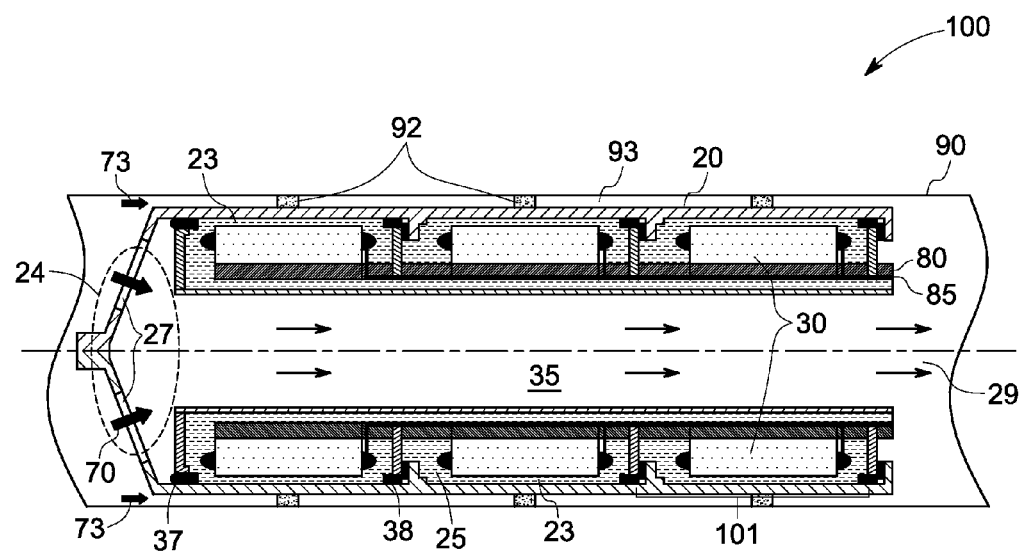
FIG. 10 illustrates a schematic of an electric machine in accordance with one or more embodiments of the present invention.

Referring now to FIG. 10, the figure illustrates an electric machine 100 configuration such that the gap 23 includes a dielectric fluid or a gas 25. In some embodiments, the dielectric fluid or gas functions as a coolant fluid. In some other embodiments, a fluid filled gap separates an inner surface of the hollow rotor from the stator. In one embodiment, the gas within the gap may be air. In another embodiment, the gas within the gap may be a relatively inert gas such as helium or argon. In one embodiment, the gas within the gap is nitrogen.

In some embodiments, a dielectric fluid filled gap separates an inner surface of the hollow rotor from the stator. In some embodiments, the gap includes a pressurized dielectric fluid. In some embodiments, the machine is filled with a pressurized dielectric fluid which is at a higher pressure than the environment outside of the machine. In some embodiments the pressurized dielectric fluid leaks outwardly from the machine interior as a means of preventing ingress of the working fluid into the interior of the machine.

Suitable insulation materials and dielectric coolant fluids include for example, insulation materials disclosed in U.S. patent applications Ser. Nos. 12/968437 and 13/093306, which are incorporated by reference herein in their entirety so long as not contradictory to the teachings disclosed herein. Non limiting examples of dielectric coolant fluids include silicone oils, aromatic hydrocarbons such as biphenyl, diphenylether, fluorinated polyethers, silicate ester fluids, perfluorocarbons, alkanes, and polyalphaolefins. In some embodiments, a combination of thermal management (using circulating dielectric oil), as well as the use of inorganic solid motor insulation materials, may allow for a peak motor temperature of 370° C. In some embodiments, electric motor configurations in accordance with some embodiments of the invention, may allow for a peak motor temperature of 330° C.

In some embodiments, as indicated in FIG. 10, the electric machine 100 further includes one or more seals 37 configured to preclude fluid communication between the gap 23 and one or both of the fluid inlet 27 and the flow channel 35. In some embodiments, seals 37 prevent the working fluid from entering the machine and coming into contact with internal machine components such as the stator. In some embodiments, the electric machine 100 further includes one or more fluid bearings, such as, for example, oil bearings 38.

As indicated in FIGS. 9 and 10, in some embodiments, the electric machine 100 includes a plurality of modules 101. In some embodiments, the plurality of modules 101 include a hollow rotor 20 and a stator 30 disposed within the hollow rotor, wherein the stator 30 defines a flow channel 35, as indicated in FIGS. 9 and 10. The electric machine 100 may further include one or more cable conduits 80, in some embodiments. The cable conduits may define a channel for electric cable 85, in some embodiments.

In some embodiments, as described in detail later, the electric machine 100 (such as, for example, an electric motor) may be further disposed within a well bore. Referring again to FIGS. 9 and 10, in some embodiments, the electric motor 100 may be configured to be disposed within a well bore 90. In some embodiments, the electric machine 100 may be configured to be supported within the wellbore 90 using a plurality of suitable bearings 92. Further, in some embodiments, as illustrated in FIGS. 9 and 10, the outer surface of the electric motor 100 and an inner surface of the well bore 90 may define a gap 93 that may allow for passage of a portion of the working fluid (indicated by direction arrows 73). In some embodiments, the passage of a portion of the working fluid in the gap 93 between the electric motor 100 and the bore hole 90 may provide for cooling of the electric motor 100.

The electric motor configurations in accordance with some embodiments of the invention may be useful for a wide variety of applications. For example, in some embodiments, the motors provided by the present invention may be used in situations in which, during operation, the motor is disposed within a confined space such as a pipe, a shipboard compartment or a well bore.

In some embodiments, the motor configurations of the present invention may be useful in an in-line pump capable of moving a fluid at relatively high rates as compared to conventional in-line pumps. The motors configurations in accordance with some embodiments of the invention and the pumping systems including them may be useful in a wide variety of applications, such as in-line pumps in high flow rate on-board fire-fighting systems, compact high flow rate shipboard emergency water removal systems, in-line high flow fluid transfer pumps in chemical manufacture and distribution, in-line high flow fluid transfer pumps in petroleum refining and distribution, and in line high flow fluid transfer pumps which can be maintained in an aseptic environment needed in medical and food applications.

In some embodiments, an electric fluid pump is presented. The electric fluid pump, in some embodiments, includes an electric motor including a hollow rotor; and a stator disposed within the hollow rotor, the stator defining a flow channel. The hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the hollow rotor is characterized by a largest cross-sectional area occupied by the hollow rotor, and wherein the flow channel is characterized by a smallest cross-sectional area of the flow channel, wherein the smallest cross-sectional area of the flow channel is at least about 25% of the largest cross-sectional area of the hollow rotor. In some embodiments, the electric fluid pump further includes a transition coupling configured to join the hollow rotor to a drive shaft of a pumping device to be powered by the motor; and one or more intake ports defined by the transition coupling, the first end portion, or both the transition coupling and the first end portion, said intake ports being in fluid communication with the fluid inlet and the flow channel of the stator. In some embodiments, the electric fluid pump further includes a pumping device including one or more impellers fixed to a drive shaft powered by the electric motor.

In some embodiments, the electric fluid pump in accordance with some embodiments of the invention includes a first set of impellers mounted on a first drive shaft, and a second set of impellers mounted on a second driveshaft (not shown), said first and second drive shafts being configured to be driven by the hollow rotor, said first and second drive shafts being configured to rotate in opposite directions.

In some embodiments, the electric fluid pump in accordance with some embodiments of the invention includes a pumping device housing (also referred to as a pump housing) defining a fluid inlet and containing a pump section including one or more impellers fixed to a drive shaft powered by the electric motor. In one or more embodiments, the electric fluid pump includes stationary diffusers mounted to an inner surface of the pumping device housing.

Figure 11:
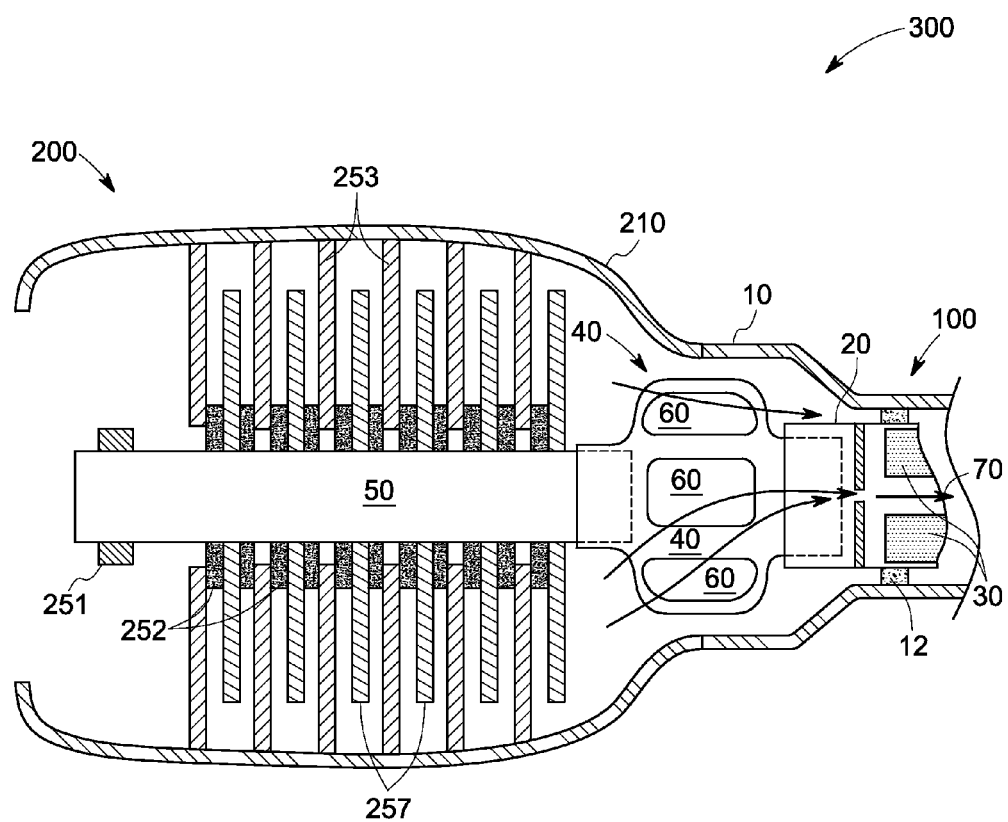
FIG. 11 illustrates a schematic of an electric fluid pump in accordance with one or more embodiments of the present invention.

Referring now to FIG. 11, the figure illustrates an electric fluid pump 300 in accordance with some embodiments of the invention. The electric fluid pump includes an electric motor 100 configured to power a pump section 200. In the embodiment shown, only a portion of motor 100 is visible. Pump 200 include a pump housing 210 and impellers 257 attached to drive shaft 50 which is coupled to hollow rotor 20 of large diameter electric motor 100 via transition coupling 40. In the embodiment shown, transition coupling 40 is an independent component (i.e. not integral to either of drive shaft 50 or hollow rotor 20) joining to both drive shaft 50 and hollow rotor 20. Pump 200 also includes stationary diffusers 253 and thrust bearings 252, in some embodiments. Thrust bearings 252, at times herein referred to as thrust washers, are positioned between the stationary diffusers and the rotatory impellers, in some embodiments. In some embodiments, a working fluid may be impelled by a series of impellers 257 axially (indicated by direction arrows 70) along drive shaft 50 toward and though intake ports 60.

In the embodiment shown, drive shaft 50 is shown as supported by radial bearing 251. Although only a single radial support bearing is featured in FIG. 6, a plurality of radial bearings may be included. In some embodiments, the electric fluid pump 300 provided by the present invention may further include a high pressure, high temperature dielectric fluid flow loop that provides for cooling for the motor components (not shown).

In some embodiments, the electric fluid pump 300 is configured to operate in a borehole. In some embodiments, the electric fluid pump 300 is configured to operate in a geothermal production well. In some embodiments, the electric fluid pump 300 may be capable of pumping production fluids from a wellbore or an oilfield. The production fluids may include hydrocarbons (oil) and water, for example.

Figure 12:
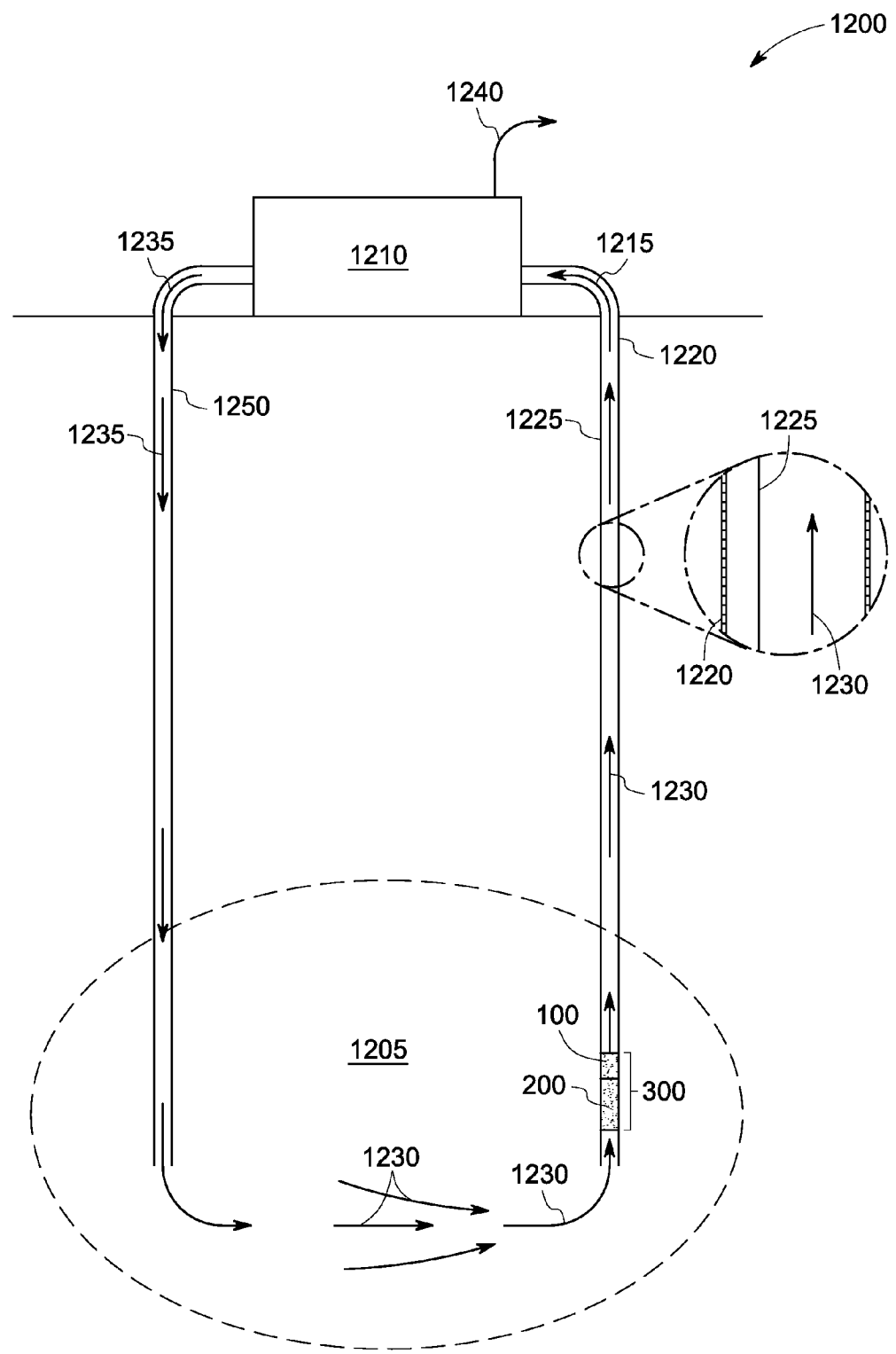
FIG. 12 illustrates a schematic of a geothermal energy extraction system in accordance with one or more embodiments of the present invention.

Referring now to FIG. 12, the figure illustrates a geothermal well and thermal energy extraction system 1200 according to some embodiments of the present invention. In the embodiment shown, an electric fluid pump 300 in accordance with some embodiments of the present invention is disposed within a geothermal production well 1220. As noted earlier, the electric fluid pump includes the electric motor 100 and the pump section 200. In some embodiments, as indicated in FIG. 12, hot water 1230 from a geothermal field 1205 enters the geothermal production well 1220 and is impelled to the surface by electric fluid pump 300 powered by electric cable 1225.

In some embodiments, at the surface, energy 1240 may be extracted from the hot water in an energy recovery unit 1210 coupled to production well 1220 at wellhead 1215. As will be appreciated by those of ordinary skill in the art, various methods may be employed to extract energy, including steam generation and driving an electric turbine. In one embodiment, the energy recovery unit 1210 includes an organic Rankine cycle. In some further embodiments, cooled water 1235 produced by removing energy from the hot water 1230 may be returned to the geothermal field 1205 via injection well 1250 where it may absorb heat from the field to produce hot water 1230.

As noted earlier, in some embodiments, the electric fluid pump is an Electric Submersible Pump (ESP) optimized for operation within a well bore and includes at least one outside rotor electric motor in accordance with some embodiments of the present invention.

In some embodiments of the present invention, the ESP includes one or more electric motors configured to power one or more pumping sections. In some embodiments, the ESP provided by the present invention includes a modular motor that has been optimized for power density and is divided into 16 sections, with a total motor length of approximately 20 meters. In some embodiments, the ESP provided by the present invention includes approximately 126 impeller/diffuser stages having a total length of about 20 meters and a hollow rotor electric motor sections having a length of about 16 meters, making the combined total length of the ESP motor and pumping sections approximately 46 meters. The total length of an ESP, according to some embodiments of the present invention, may be typically somewhat longer than the sum of the lengths of the motor and pumping sections due to the presence of additional structural features arrayed along the ESP pump-motor axis, for example a protector section. The total length of an ESP, according to some embodiments of the present invention, may vary widely, but in geothermal production well applications, the length of such an ESP may typically fall in a range between 30 and 60 meters.

In one embodiment, the ESP is optimized for operation within a geothermal well bore having a bore diameter of about 10.625 inches. In one such embodiment, the ESP is configured to utilize approximately 5.0 MW of power, the amount needed to boost 80 kg/second (kg/s) of a 300° C. working fluid (water, with a gas fraction of 2% or less) at a pressure of 300 bar. In such an embodiment, the ESP may be operated to advantage at a pump/motor speed of about 3150 RPM in order to balance system efficiency and pump stage pressure rise with motor thermal concerns. A design-of-experiments analysis using Computational Fluid Dynamics (CFD) carried out by the inventors revealed that pump efficiency as high as 78% could be achieved at a flow rate of 80 kg/second through an ESP, according to one or more embodiments of the present invention.

In some embodiments, an electric power generation device is presented. In some embodiments, the electric power generation device includes a generator including a magnetic hollow rotor; and a stator disposed within the hollow rotor, the stator defining a flow channel. The magnetic hollow rotor includes a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and wherein the magnetic hollow rotor is characterized by a largest cross-sectional area of hollow rotor, and wherein the flow channel is characterized by a smallest cross-sectional area of the flow channel, wherein the smallest cross-sectional area of the flow channel is at least about 25% of the largest cross-sectional area of the magnetic hollow rotor.

In some embodiments, the electric power generation device further includes a transition coupling configured to join the magnetic hollow rotor to a drive shaft of a turbine device configured to drive the hollow magnetic hollow rotor; and one or more outlet ports defined by the transition coupling, the second end portion, or both the transition coupling and the second end portion; said outlet ports being in fluid communication with the flow channel of the stator. In some embodiments, the electric power generation device further includes a turbine device including one or more impellers fixed to the drive shaft. In some further embodiments, the turbine device includes a turbine device housing defining one or more fluid inlets.

Figure 13:
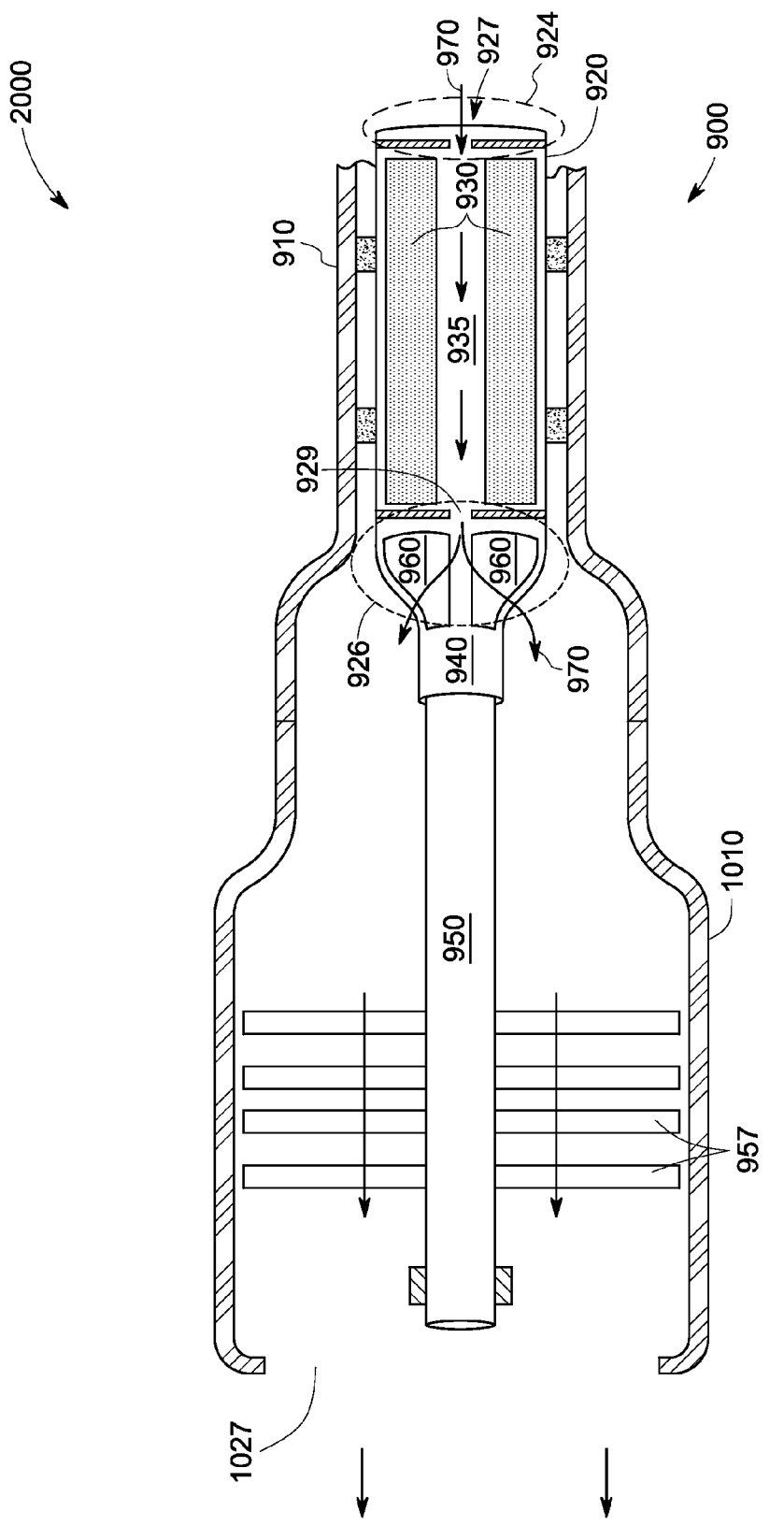
FIG. 13 illustrates a schematic of a power generation system in accordance with one or more embodiments of the present invention.

Referring now to FIG. 13, the figure illustrates a system 2000 for electric power generation according to one or more embodiments of the present invention. In the embodiment shown, the system includes a generator 900 including a generator housing 910, a hollow magnetic rotor 920 configured to rotate within the housing, and a stator 930 contained within the hollow rotor 920. The hollow magnetic rotor has a first end portion 924 defining a fluid inlet 927, and a second end portion 926 defining a fluid outlet 929. The fluid inlet, the flow channel and the fluid outlet are in fluid communication such that a fluid entering the flow channel 935 via the fluid inlet 927 may pass through flow channel 935 and exit the hollow magnetic rotor via fluid outlet 929. In some embodiments, the hollow rotor 920 is characterized by a largest cross-sectional area. The stator 930 defines a flow channel 935 running the length of the hollow rotor and being characterized by a smallest cross-sectional area, the smallest cross-sectional area of the flow channel 935 being at least 25% of the largest cross-sectional area of the hollow rotor 920.

In some embodiments, the electric power generation device 2000 further includes a transition section 940 configured to join the hollow magnetic rotor 920 to a drive shaft 950 of a turbine device 1000 configured to drive the hollow magnetic rotor 920. In the embodiment shown, transition section 940 is shown as defining outlet ports 960 configured to allow passage of fluid from the flow channel and fluid outlet of the hollow magnetic rotor. Transition section 940 is coupled to a drive shaft 950 of turbine 1000 (at times herein referred to as a turbine device). In the embodiment shown, turbine 1000 comprises turbine blades 957 and turbine housing 1010. In some embodiments, the turbine device housing 1010 defines one or more fluid inlets.

In some embodiments, during operation, the system for electric power generation illustrated in FIG. 13 may generate electricity as follows. A fluid flowing under pressure enters the motor 900 via fluid inlet 927 and flows through flow channel 935 as indicated by direction arrows 970. Fluid passes into the transition coupling 940 and exits into the cavity defined by generator housing 910 and turbine housing 1010. The fluid flowing under pressure encounters the turbine blades 957 during its passage through the turbine. Energy from the fluid is transferred to the turbine blades causing the blades and drive shaft 950 to rotate. The rotation of drive shaft 950, in turn, causes the hollow magnetic rotor 920 to rotate in close proximity to stator 930 and generating electric power thereby. The fluid, having transferred a portion of its contained energy to the turbine then passes out of turbine 1000 via turbine fluid outlet 1027.

Those of ordinary skill in the art will appreciate the close relationship between one or more embodiments of the electric power generation device presented by the present invention and one or more embodiments of the electric fluid pump presented by the present invention. Thus, simply reversing the direction of fluid flow and electric current flow may convert a power consuming electric fluid pump into an electric power generating machine.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:
1. An electric fluid pump, comprising:
  (i) an electric motor comprising:
    (a) a hollow rotor; and
    (b) a stator having a cavity, and disposed within the hollow rotor, wherein the cavity in the stator defines a flow channel;
  wherein the hollow rotor comprises a first end portion defining a fluid inlet, a second end portion defining a fluid outlet; the fluid inlet, the fluid outlet, and the flow channel of the stator being configured to allow passage of a fluid from the fluid inlet to the fluid outlet via the flow channel; and
  wherein the hollow rotor is characterized by a largest cross-sectional area of hollow rotor, and wherein the flow channel is characterized by a smallest cross-sectional area of the flow channel, wherein the smallest cross-sectional area of the flow channel is at least about 25% of the largest cross-sectional area of the hollow rotor;
  (ii) a transition coupling configured to join the hollow rotor to a drive shaft of a pumping device to be powered by the motor;
  (iii) one or more intake ports defined by the transition coupling, the first end portion, or both the transition coupling and the first end portion; said intake ports being in fluid communication with the fluid inlet and the flow channel of the stator; and
  (iv) a pumping device comprising one or more impellers fixed to a drive shaft powered by the electric motor.
2. The electric fluid pump according to claim 1, comprising a first set of impellers mounted on a first drive shaft, and a second set of impellers mounted on a second driveshaft, said first and second drive shafts being configured to be driven by the electric motor, said first and second drive shafts being configured to rotate in opposite directions.
3. The electric fluid pump according to claim 1, further comprising stationary diffusers mounted to an inner surface of a pumping device housing.
4. The electric fluid pump according to claim 1, wherein the electric fluid pump further comprises a motor housing, wherein the hollow rotor is disposed within the motor housing and configured to rotate within.

* * * * *